United States Patent
Landis et al.

(10) Patent No.: US 12,271,290 B2
(45) Date of Patent: Apr. 8, 2025

(54) REMOTE DEBUGGING SESSIONS FOR FLAKY TESTS

(71) Applicant: GM Cruise Holdings LLC, San Francisco, CA (US)

(72) Inventors: Matt Landis, Bothell, WA (US); Victor Robertson, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 132 days.

(21) Appl. No.: 18/175,380

(22) Filed: Feb. 27, 2023

(65) Prior Publication Data

US 2024/0289258 A1  Aug. 29, 2024

(51) Int. Cl.
 *G06F 11/36*  (2006.01)
 *G06F 11/3668*  (2025.01)
(52) U.S. Cl.
 CPC ...... *G06F 11/3664* (2013.01); *G06F 11/3688* (2013.01)
(58) Field of Classification Search
 CPC .............. G06F 11/3664; G06F 11/3688
 USPC .................................................. 717/120–178
 See application file for complete search history.

(56) References Cited

U.S. PATENT DOCUMENTS

| | | | | |
|---|---|---|---|---|
| 11,662,997 B2* | 5/2023 | Farrier | ...................... | G06F 8/71 717/101 |
| 11,921,569 B2* | 3/2024 | Munafo | .................. | G06F 11/26 |
| 12,045,161 B2* | 7/2024 | Punathil | ............... | G06F 11/3684 |
| 2005/0204203 A1* | 9/2005 | Yang | ..................... | G06F 11/0742 714/42 |
| 2012/0131555 A1* | 5/2012 | Hossain | ................ | G06F 11/362 717/124 |
| 2012/0317443 A1* | 12/2012 | Chandran | ............ | G06F 11/3636 714/E11.208 |
| 2019/0340512 A1* | 11/2019 | Vidal | ..................... | G06N 20/00 |
| 2020/0183821 A1* | 6/2020 | Qin | ..................... | G06F 11/3692 |
| 2022/0121550 A1* | 4/2022 | Walther | ................. | G06F 30/15 |

OTHER PUBLICATIONS

Lam, Wing, et al. "Root causing flaky tests in a large-scale industrial setting." Proceedings of the 28th ACM SIGSOFT International Symposium on Software Testing and Analysis. 2019.pp. 101-111 (Year: 2029).*

(Continued)

*Primary Examiner* — Satish Rampuria

(57) ABSTRACT

Build, execution, and testing on software may be performed remotely on cluster infrastructure. Tests can be scheduled on workers in the cluster infrastructure, and results of the tests are reported to the developer. If a test fails, the developer may receive an exit code from the failed test. For tests that are flaky, an exit code provides little to no benefit to identify the cause of the flakiness. To make it easier for the developer to debug flaky tests, a test identified to be flaky can be run many times in parallel, one or more parallel executions that result in failure can be paused, and one or more remote debugging sessions can be created for the one or more parallel executions. A developer can access the remote debugging session to inspect the paused execution of the test equipped with debugging tools to determine the cause of the flakiness.

18 Claims, 8 Drawing Sheets

(56) References Cited

OTHER PUBLICATIONS

Bell, Jonathan, et al. "DeFlaker: Automatically detecting flaky tests." Proceedings of the 40th international conference on software engineering. 2018.pp.433-444 (Year: 2018).*

Ziftci, Celal, and Diego Cavalcanti. "De-flake your tests: Automatically locating root causes of flaky tests in code at google." 2020 IEEE International Conference on Software Maintenance and Evolution (ICSME). IEEE, 2020.pp. 736-745 (Year: 2020).*

Alshammari, Abdulrahman, et al. "Flakeflagger: Predicting flakiness without rerunning tests." 2021 IEEE/ACM 43rd International Conference on Software Engineering (ICSE). IEEE, 2021.pp. 1572-1584 (Year: 2021).*

Wei, Anjiang, et al. "Preempting flaky tests via non-idempotent-outcome tests." Proceedings of the 44th International Conference on Software Engineering. 2022.pp.1730-1742 (Year: 2022).*

Grano, Giovanni, et al. "Pizza versus pinsa: On the perception and measurability of unit test code quality." 2020 IEEE international conference on software maintenance and evolution (ICSME). IEEE, 2020.pp.336-347. (Year: 2020).*

Vassallo, Carmine, et al. "Configuration smells in continuous delivery pipelines: a linter and a six-month study on GitLab." Proceedings of the 28th ACM Joint Meeting on European Software Engineering Conference and Symposium on the Foundations of Software Engineering. 2020.pp. 327-337 (Year: 2020).*

Machalica et al., *How Do You Test Your Test?* Devinfra, Posted Dec. 10, 2020, Retrieved on Feb. 7, 2023, 9 pages. https://engineerig.fb.com/2020/12/10/developer-tools/probabilistic-flakiness/.

*Developing Inside a Container Using Visual Studio Code Remote Development,* Retrieved on Feb. 6, 2023, 17 pages. http://code.visualstudio.com/docs/devcontainers/containers.

*Remote Execution Overview,* Retrieved on Feb. 6, 2023, 1 page, https://bazel.build/remote/rbe.

*Testing,* Retrieved on Feb. 6, 2023, 11 pages, https://bazel.build/rules/testing.

*Debug Containerized Apps,* Retrieved on Feb. 6, 2023, 4 pages, https://code.visualstudio.com/docs/containers/debug-common.

* cited by examiner

REMOTE DEBUGGING SESSIONS FOR FLAKY TESTS

BACKGROUND

Technical Field

The present disclosure generally relates to cluster infrastructure and, more specifically, to remote debugging sessions for flaky tests.

Introduction

Cluster infrastructure can include hardware and software resources deployed to support systems with high availability, scalability, and performance. Systems can be deployed on the cluster infrastructure, and the cluster infrastructure enables the systems to service requests being made to the systems.

Autonomous vehicles (AVs), also known as self-driving cars, and driverless vehicles, may be vehicles that use multiple sensors to sense the environment and move without human input. Technology in AVs may enable vehicles to drive on roadways and to accurately and quickly perceive the vehicle's environment, including obstacles, signs, and traffic lights. AV technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
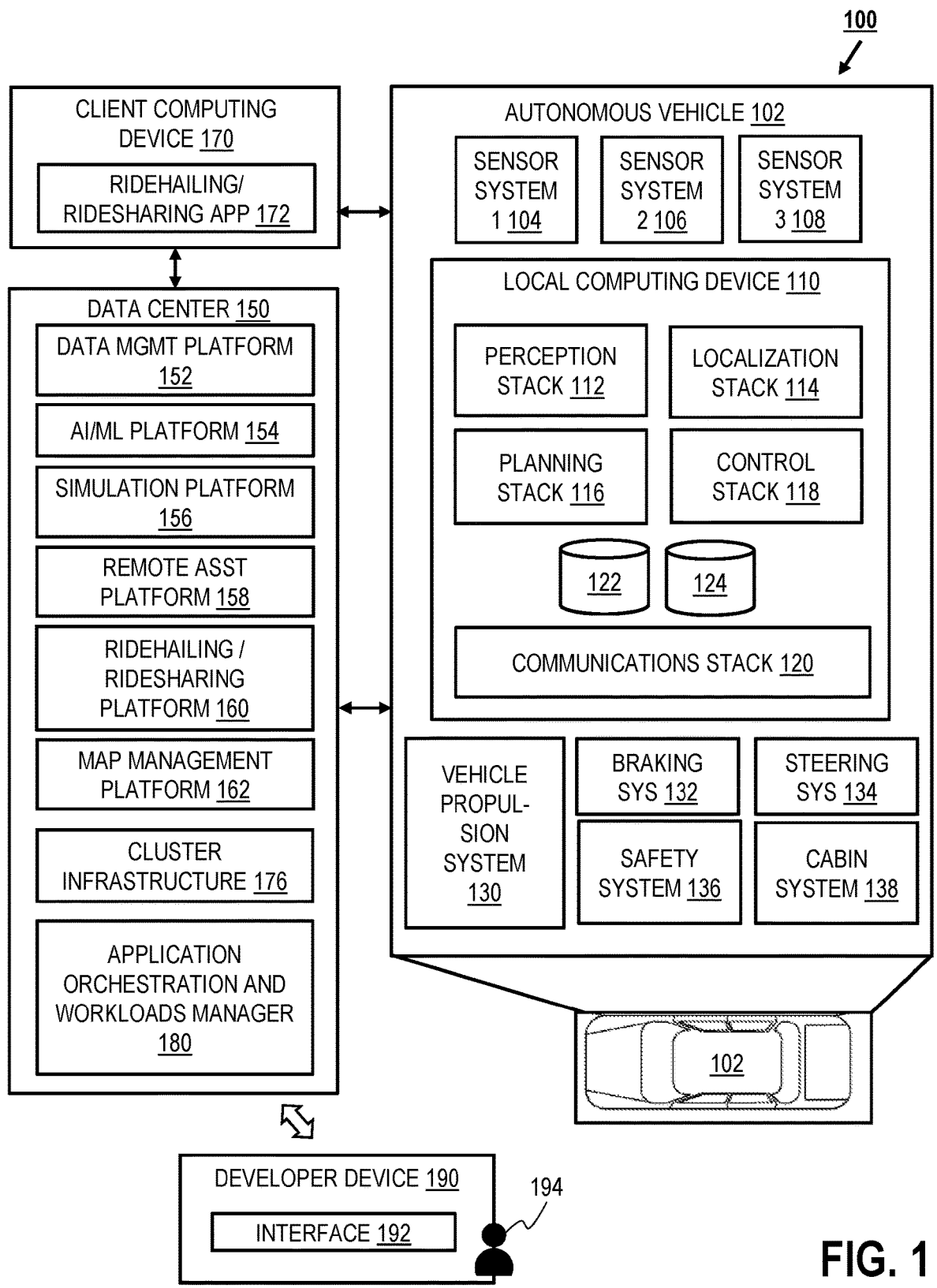
FIG. 1 illustrates an exemplary system environment that may be used to facilitate AV operations, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

Applications that support operations of an autonomous vehicle fleet can be implemented on and supported by cluster infrastructure. Examples of such applications (and platforms) are described with FIG. 1. Many developers collaborate and write source code for these applications. Collaboration between developers and continuous integration of software may be enabled by tools that can be implemented on cluster infrastructure. Code repositories that allow collaboration between developers may be hosted on cluster infrastructure. Developers may use code editors or integrated development environments that are hosted on cluster infrastructure (as opposed to or in addition to running these developer tools locally on their machines). Build toolchains that compile source code and integrate builds into large software applications may be implemented on cluster infrastructure. Testing of software processes and builds may be run on cluster infrastructure. Monitoring of software processes and builds may be implemented on cluster infrastructure. Cost of having and maintaining cluster infrastructure to support developers can be high. It is not trivial to improve the developer experience while working on these applications and to efficiently utilize the resources on cluster infrastructure.

In some cases, build, execution, and testing of software may be performed remotely on cluster infrastructure. Remote build, execution, and testing can be scheduled on workers in the cluster infrastructure, and results of the tests are reported to the developer. A test suite having different assertions for the build can be verified against the behavior of the build. The test suite can check whether the build was successful and the software operates normally. If a test fails, the developer may receive an exit code from the failed test.

In some cases, unit testing and integration testing may be performed remotely on cluster infrastructure. Various tests may be routinely scheduled on and executed by workers in the cluster infrastructure as developers change source code and add new features, to find potential regressions in the code. A test suite having different assertions for the software can be verified against the behavior and outputs of the software. The test suite can verify whether the software is generating expected outputs. Pass/fail results of the tests can be reported to the developer. The developer may see a score for a test suite (e.g., representing a number or proportion of pass results relative to a total number of tests in the test suite).

In some cases, the software to support an AV may be tested using simulations. Simulation tests may be performed remotely on cluster infrastructure. Simulated environments may be used to test behavior of a simulated AV. Many simulations may be run. A test suite having different assertions for AV behavior can be verified against the simulations. The test suite can verify whether the simulated AV encountered a collision, or got too close to other simulated assets on the road. Pass/fail results of the tests can be reported to the developer. The developer may see a score for a test suite (e.g., representing a number or proportion of pass results relative to a total number of tests in the test suite).

Testing can be run on cluster infrastructure by running an execution of a software process (e.g., code, application, build, etc.), and verifying whether the execution meets one or more assertions defined in one or more tests in a test suite. If the execution meets an assertion (e.g., the execution behaved as expected), then the test result is a pass. If the execution does not meet the assertion (e.g., the execution did not behave as expected), then the test result is a fail.

Remote resources on cluster infrastructure can be allocated and configured to perform unit tests. Performing unit tests may include running software processes and checking outputs of the software processes against assertions of expected outputs. Tools implemented on cluster infrastructure may provide functionalities to allow developers to author and define unit tests. Tools implemented on cluster infrastructure may provide functionalities to allow developers to receive and view results of performing the unit tests (e.g., success, failures, pass-rates, flake rates, etc.).

Remote resources on cluster infrastructure can be allocated and configured to perform integration tests. Performing integration tests may include testing interactions between different software processes (e.g., components of a larger software system) to determine whether the interactions meet asserted expected interactions. In some cases, performing integration tests may include integrating software processes (e.g., components of a larger software system) logically and testing them as a group.

Remote resources on cluster infrastructure can be allocated and configured to perform build verification tests. Performing build verification tests may include verifying (core) functionalities of new builds or daily builds.

For some tests, the results are flaky. A flaky test is a test that fails to produce a same result (e.g., pass or fail) each time the same test is run. A flaky test may produce inconsistent results over time. There are many potential causes for a flaky test. Examples of potential causes include: a bug in the source code, an issue with the way the test is written or defined, a dependency failing, an external factor (e.g., a transient external issue) that may compromise the test result, a change in the execution environment, a change in the underlying hardware, etc. For tests that are flaky, an exit code or a fail result reported to the developer when a test fails provides little to no benefit to identify the cause of the flakiness.

Developers developing applications such as the applications described with FIG. 1 may be occupied with a variety of tasks, and may be performing under pressure to complete tasks timely and write code that are free of bugs. Debugging flaky tests remains an important task that takes up a significant portion of developer time because flaky tests can be non-deterministic, and can impact developer's ability to perform tasks on time. If developer experience for debugging flaky tests can improve, productivity of developers may also improve.

Identify flaky tests and debugging flaky tests sometimes involve many executions, which can take up valuable resources on cluster infrastructure if not managed properly. Also, remote debugging sessions can consume valuable resources on cluster infrastructure. For example, resources may be held up to support a debugging session.

To alleviate some of these problems (e.g., to make it easier for the developer to debug flaky tests), systems and methods can be provided to offer a remote debugging session that can help the developer hone into the cause of a flaky test. The systems and methods can be implemented to use resources on cluster infrastructure effectively and efficiently. In some embodiments, a test identified to be flaky can be run or executed many times in parallel. One or more parallel executions that result in failure can be paused. One or more remote debugging sessions can be created for the one or more parallel executions. A developer can access the remote debugging session to inspect the paused execution of the test equipped with debugging tools to determine the cause of the flakiness.

Additional aspects are described in greater detail with FIGS. 1-7.

Systems for an AV Fleet Supported by Cluster Infrastructure

To better understand the varied systems that can be implemented on cluster infrastructure, FIG. 1 illustrates an exemplary system environment that may be used to facilitate AV operations, according to some aspects of the disclosed technology.

One of ordinary skill in the art will understand that, for the AV management system 100 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, a client computing device 170, and a developer device 190 used by developer 194. The AV 102, the data center 150, the client computing device 170, and the developer device 190 may communicate with one another over one or more networks.

AV 102 may navigate about roadways without a human driver based on sensor signals generated by multiple sensor systems 104, 106, and 108. The sensor systems 104-108 may include different types of sensors and may be arranged about the AV 102. For instance, the sensor systems 104-108 may comprise Inertial Measurement Units (IMUs), cameras (e.g., still image cameras, video cameras, etc.), light sensors (e.g., light detection and ranging (LIDAR) systems, ambient light sensors, infrared sensors, etc.), radio detection and ranging (RADAR) systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 may be a camera system, the sensor system 106 may be a LIDAR system, and the sensor system 108 may be a RADAR system. Other embodiments may include any other number and type of sensors.

AV 102 may also include several mechanical systems that may be used to maneuver or operate AV 102. For instance, the mechanical systems may include vehicle propulsion system 130, braking system 132, steering system 134, safety system 136, and cabin system 138, among other systems. Vehicle propulsion system 130 may include an electric motor, an internal combustion engine, or both. The braking system 132 may include an engine brake, a wheel braking system (e.g., a disc braking system that utilizes brake pads), hydraulics, actuators, and/or any other suitable componentry configured to assist in decelerating AV 102. The steering system 134 may include suitable componentry configured to control the direction of movement of the AV 102 during navigation. Safety system 136 may include lights and signal indicators, a parking brake, airbags, and so forth. The cabin system 138 may include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 may include one or more client interfaces (e.g., GUIs, Voice User Interfaces (VUIs), etc.) for controlling certain aspects of the mechanical systems 130-138.

AV 102 may additionally include a local computing device 110 that is in communication with the sensor systems 104-108, the mechanical systems 130-138, the data center 150, and the client computing device 170, among other systems. The local computing device 110 may include one or more processors and memory, including instructions that may be executed by the one or more processors. The instructions may make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, an HD geospatial database 122, and an AV operational database 124, among other stacks and systems. Collectively, a perception stack 112, a mapping and localization stack 114, a planning stack 116, a control stack 118 of the local computing device 110 may provide functionalities of an AV stack.

Perception stack 112 may enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 may detect and classify objects and determine their current and predicted locations, speeds, directions, and the like. In addition, the perception stack 112 may determine the free space around the AV 102 (e.g., to maintain a safe distance from other objects, change lanes, park the AV, etc.). The perception stack 112 may also identify environmental uncertainties, such as where to look for moving objects, flag areas that may be obscured or blocked from view, and so forth.

Mapping and localization stack 114 may determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 may compare sensor data captured in real-time by the sensor systems 104-108 to data in the HD geospatial database 122 to determine its precise (e.g., accurate to the order of a few centimeters or less) position and orientation. The AV 102 may focus its search based on sensor data from one or more first sensor systems (e.g., GPS) by matching sensor data from one or more second sensor systems (e.g., LIDAR). If the mapping and localization information from one system is unavailable, the AV 102 may use mapping and localization information from a redundant system and/or from remote data sources.

The planning stack 116 may determine how to maneuver or operate the AV 102 safely and efficiently in its environment. For example, the planning stack 116 may receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 may determine multiple sets of one or more mechanical operations that the AV 102 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 may select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 may manage the operation of the vehicle propulsion system 130, the braking system 132, the steering system 134, the safety system 136, and the cabin system 138. The control stack 118 may receive sensor signals from the sensor systems 104-108 as well as communicate with other stacks or components of the local computing device 110 or a remote system (e.g., the data center 150) to effectuate the operation of the AV 102. For example, the control stack 118 may implement the final path or actions from the multiple paths or actions provided by the planning stack 116. The implementation may involve turning the routes and decisions (e.g., a trajectory) from the planning stack 116 into commands for the actuators that control the AV's steering, throttle, brake, and drive unit.

The communication stack 120 may transmit and receive signals between the various stacks and other components of the AV 102 and between the AV 102, the data center 150, the client computing device 170, and other remote systems. The communication stack 120 may enable the local computing device 110 to exchange information remotely over a network. The communication stack 120 may also facilitate local exchange of information, such as through a wired connection or a local wireless connection.

The HD geospatial database 122 may store HD maps and related data of the streets upon which the AV 102 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 124 may store raw AV data generated by the sensor systems 104-108 and other components of the AV 102 and/or data received by the AV 102 from remote systems (e.g., the data center 150, the client computing device 170, etc.). In some embodiments, the raw AV data may include HD LIDAR point cloud data, image or video data, RADAR data, GPS data, and other sensor data that the data center 150 may use for creating or updating AV geospatial data.

The data center 150 may send and receive various signals to and from the AV 102 and the client computing device 170. These signals may include sensor data captured by the sensor systems 104-108, roadside assistance requests, software updates, ridesharing pick-up and drop-off instructions, and so forth.

In this example, the data center 150 includes one or more of a data management platform 152, an Artificial Intelligence/Machine-Learning (AI/ML) platform 154, a simulation platform 156, a remote assistance platform 158, a ridehailing/ridesharing platform 160, and a map management platform 162, among other systems. These platforms may support operations of a fleet of AVs like AV 102. Many of these applications/platforms can be implemented on and supported by cluster infrastructure 176 of data center 150. In some cases, there may be multiple data centers, like data center 150, in different geographical locations, which would support these applications/platforms.

Data management platform 152 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 may access data stored by the data management platform 152 to provide their respective services.

The AI/ML platform 154 may provide the systems for training and evaluating machine-learning algorithms for operating the AV 102 (e.g., machine-learning models used in the AV stack), the simulation platform 156, the remote assistance platform 158, the ridehailing/ridesharing platform 160, the map management platform 162, and other platforms and systems. Using the AI/ML platform 154, data scientists may prepare data sets from the data management platform 152; select, design, and train machine-learning models; evaluate, refine, and deploy the models; maintain, monitor, and retrain the models; and so on.

The simulation platform 156 may simulate (or mimic) and/or augment real-world conditions (e.g., roads, lanes, buildings, obstacles, other traffic participants (e.g., other vehicles, cyclists, and pedestrians), trees, lighting conditions, weather conditions, etc.) so that the AV stack of an AV may be tested in a virtual environment that is similar to a real physical world. The simulation platform 156 may create a virtual environment that emulates physics of the real-world and sensors of an AV. Testing and evaluating AVs in simulation platform 156 can be more efficient and allow for creation of specific traffic scenarios that may occur rarely in the real-world. Moreover, the AV stack can even be tested in thousands of scenarios in parallel in simulation. More specifically, the AV stack may be executed in a simulator simulating various traffic scenarios at a time. With simulation platform 156, the AV stack implementing the perception, prediction, planning, and control algorithms can be developed, evaluated, validated, and fine-tuned in a simulation environment. The simulation platform 156 can also be used to evaluate only a portion of the AV stack.

The remote assistance platform 158 may generate and transmit instructions to control the operation of the AV 102. For example, in response to active trigger(s) being detected by the local computing device 110 on the AV 102, the remote assistance platform 158 may respond by creating a remote assistance session with a remote assistance operator to assist the AV 102. The remote assistance platform 158 may, with assistance from the remote assistance operator, generate and transmit instructions to the AV 102 to cause the AV 102 to perform a special driving maneuver (e.g., to drive AV 102 in reverse). The remote assistance platform 158 may utilize the remote assistance session to communicate with a customer in the AV 102 via the client computing device 170 to resolve concerns of the customer.

The ridehailing/ridesharing platform 160 (e.g., a web application) may interact with a customer of a ridehailing/ridesharing service via a ridehailing/ridesharing application 172 executing on the client computing device 170. Ridehailing/ridesharing platform 160 may provide delivery services as well. The client computing device 170 may be any type of computing system, including a server, desktop computer, laptop, tablet, smartphone, smart wearable device, gaming system, or other general-purpose computing device for accessing the ridehailing/ridesharing application 172. The client computing device 170 may be a customer's mobile computing device or a computing device integrated with the AV 102 (e.g., the local computing device 110). The ridehailing/ridesharing platform 160 may receive requests to be picked up or dropped off from the ridehailing/ridesharing application 172, and dispatch the AV 102 for the trip. A similar platform can be provided for delivery services.

Map management platform 162 may provide a set of tools for the manipulation and management of geographic and spatial (geospatial) and related attribute data. The data management platform 152 may receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data may be processed, and map management platform 162 may render base representations (e.g., tiles (2D), bounding volumes (3D), etc.) of the AV geospatial data to enable users to view, query, label, edit, and otherwise interact with the data. Map management platform 162 may manage workflows and tasks for operating on the AV geospatial data. Map management platform 162 may control access to the AV geospatial data, including granting or limiting access to the AV geospatial data based on user-based, role-based, group-based, task-based, and other attribute-based access control mechanisms. Map management platform 162 may provide version control for the AV geospatial data, such as to track specific changes that (human or machine) map editors have made to the data and to revert changes when necessary. Map management platform 162 may administer release management of the AV geospatial data, including distributing suitable iterations of the data to different users, computing devices, AVs, and other consumers of HD maps. Map management platform 162 may provide analytics regarding the AV geospatial data and related data, such as to generate insights relating to the throughput and quality of mapping tasks.

Data center 150 includes cluster infrastructure 176. Cluster infrastructure 176 may include hardware resources and software resources. Hardware resources can include computing/processing resources, data storage resources, network resources, etc. Examples of computing/processing resources may include machine-learning processors (e.g., machine-learning accelerators or neural processing unit), central processing units (CPUs), graphics processing units (GPUs), quantum computers, etc. Examples of data storage resources may include disk storage devices, memory storage devices, database servers, etc. Network resources may include network appliances (e.g., switches, routers, etc.), network connections, interconnects, etc. Software resources may include firmware for the hardware resources, operating systems for the hardware resources, virtual machines running on the hardware resources, software that manage the hardware resources, etc. Cluster infrastructure 176 may include resources managed by one or more providers. A cluster operator may define and provision resources in a cluster through machine-readable definition files.

The data center 150 having cluster infrastructure 176 may be a private cloud (e.g., an enterprise network, a co-location provider network, etc.), a public cloud (e.g., an infrastructure as a service (IaaS) network, a platform as a service (PaaS) network, a software as a service (SaaS) network, or other communication service provider (CSP) network), a hybrid cloud, a multi-cloud, and so forth. The data center 150 may include cluster infrastructure 176, which can include hardware and software resources remote to the local computing device 110 for managing a fleet of AVs and AV-related services. For example, in addition to managing the AV 102, the data center 150 may also support a ridehailing/ridesharing service, a delivery service, a remote/roadside assistance service, street services (e.g., street mapping, street patrol, street cleaning, street metering, parking reservation, etc.), sensor calibration, and the like.

In some cases, cluster infrastructure 176 may include one or more clusters. A cluster may have one or more nodes. A node (also called a worker) may be a resource on which an application, a system, a service, a workload, a job, a task, etc. can be deployed. Nodes may be considered a type of resource in the cluster infrastructure 176. A node may include a virtual or physical machine. Virtual machines are machines that emulate physical machines and are implemented on physical hardware. A node has a corresponding configuration. The configuration may include properties such as a machine type, a resource type, a specific operating system image, a minimum computing platform, amount of allocable data and/or computing resources for the node (also referred to as a shape of a node), a specific network interface, maximum number of applications that can run on the node, etc. The health/status of the node may be managed by the control plane. A node pool (also called a worker pool) may be a group of nodes within a cluster that all have the same configuration. A cluster may have one or more node pools.

Developers are experts are developing software applications, and may not be experts at managing cluster infrastructure 176 or utilizing resources on cluster infrastructure 176 effectively. For that reason, it is desirable to implement application orchestration and workloads manager 180 to handle interactions developers have with the cluster infrastructure 176 (e.g., deployment of applications, creation of remote development environments, creation of remote runtime environments, scheduling and running tasks/jobs, etc.). Application orchestration and workloads manager 180 may abstract away the details of managing cluster infrastructure 176 from developers such as developer 194, while at the same time, enable developers to perform a wide range of tasks on cluster infrastructure 176 easily and efficiently. Application orchestration and workloads manager 180 can be implemented on cluster infrastructure 176.

Applications (and services) can be deployed, and jobs/tasks can be run, on resources of cluster infrastructure 176 using application orchestration and workloads manager 180. Developer 194 may use interface 192 running on developer device 190 to submit requests to deploy applications onto cluster infrastructure 176 to application orchestration and workloads manager 180. Developer 194 may use interface 192 running on developer device 190 to submit jobs/tasks to application orchestration and workloads manager 180, so that the jobs/tasks can be scheduled and executed on cluster infrastructure 176.

Application orchestration functionality of application orchestration and workloads manager 180 can orchestrate deployment, maintenance, and scaling of applications on the resources in cluster infrastructure 176. For example, application orchestration and workloads manager 180 can deploy and maintain platforms such as data management platform 152, AI/ML platform 154, simulation platform 156, remote assistance platform 158, ridehailing/ridesharing platform 160, and map management platform 162.

For application orchestration, application orchestration and workloads manager 180 can implement a control plane in the cluster that may service requests for application deployment and requests for maintaining applications running on the cluster. In some embodiments, a control plane may include persistent, lightweight, distributed key-value data store to store configuration data of the cluster, an application programming interface, a scheduler to assign unscheduled applications to a specific resource in the cluster, one or more controllers/operators each having a reconciliation loop, and a controller manager that manages the one or more controllers/operators. The control plane may orchestrate applications onto resources in the cluster, which may be organized and managed by the control plane using nodes and optionally node pools.

Application orchestration and workloads manager 180 may allow users of cluster infrastructure 176 (e.g., developer 194) to configure, deploy, coordinate, and manage applications on cluster infrastructure 176. In some cases, application orchestration and workloads manager 180 may provide resource usage optimization, achieve certain quality of service parameters, and load balancing of the applications on cluster infrastructure 176. While not required, applications deployed on cluster infrastructure 176 can be containers (or containerized applications). A container means that the code and dependencies are packaged as a unit or image (e.g., having code, runtime, system tools, system libraries and settings) in such a way that the application can be created and run quickly on cluster infrastructure 176 regardless of the underlying cluster infrastructure environment.

Workload management functionality of application orchestration and workloads manager 180 can maintain queues for submitted jobs/tasks and manage execution of the jobs/tasks. Some of these jobs/tasks may be performed by applications orchestrated by application orchestration and workloads manager 180.

For workload management, application orchestration and workloads manager 180 may manage and orchestrate resources to execute a variety of jobs or tasks that can be submitted by users of the cluster infrastructure 176 (e.g., developer 194). Resources on cluster infrastructure can be consumed to run/execute the jobs/tasks. For example, application orchestration and workloads manager 180 may schedule jobs/tasks to one or more workers (or a worker pool) in cluster infrastructure 176. Application orchestration and workloads manager 180 may monitor for the completion of the jobs/tasks, and return results back to the users who submitted the jobs/tasks. Application orchestration and workloads manager 180 may scale resources (e.g., add resources, recycle resources, terminate resources, etc.) based on the number of jobs/tasks in the queue. Application orchestration and workloads manager 180 may abstract details of the cluster infrastructure 176 and execution of jobs or tasks from the users of the cluster infrastructure 176 (e.g., developer 194). Application orchestration and workloads manager 180 may include one or more job/task queues to accept various jobs/tasks, and can schedule jobs/tasks appropriately onto resources of cluster infrastructure 176. One or more schedulers in application orchestration and workloads manager 180 may implement different scheduling schemes of jobs/tasks, based on different scheduling strategies. Application orchestration and workloads manager 180 may create suitable runtime environments or deploy suitable applications/services/systems to execute the jobs/tasks.

Besides deploying applications and executing jobs/tasks for users of cluster infrastructure 176, application orchestration and workloads manager 180 can allocate resources and implement remote development tools for developers like developer 194.

Application orchestration and workloads manager 180 can create remote developer environments that can be accessible by developer 194 via interface 192. Similar to deploying applications, application orchestration and workloads manager 180 can deploy a remote developer environment equipped with tools for developer 194 onto cluster infrastructure 176 and allow developer 194 to use the remote developer environment for software development purposes. Using interface 192, developer 194 can write source code (e.g., using a code editor), build software, and debug source code (e.g., using a debugger) using remote developer environments. Developer 194 may use interface 192 to develop source code for platforms such as, data management platform 152, AI/ML platform 154, simulation platform 156, remote assistance platform 158, ridehailing/ridesharing platform 160, and map management platform 162. Developer 194 may use interface 192 to develop source code for perception stack 112, mapping and localization stack 114, planning stack 116, control stack 118, and communications stack 120. Developer 194 may use interface 192 develop source code for ridehailing/ridesharing application 172.

Various kinds of tests are run at different points of the development process. For example, developer 194 may use interface 192 to request from application orchestration and workloads manager 180 to build software (e.g., compile software) and test the software build. Developer 194 may use interface 192 to submit tests to be executed as jobs/tasks to application orchestration and workloads manager 180. For example, developer 194 may submit unit tests or integration tests to be performed on new software builds or whenever new features are merged. Developers and other developers may submit simulation tests to verify behavior of software in the AV stack (e.g., using AI/ML platform 154 and/or simulation platform 156). To run tests, application orchestration and workloads manager 180 can create and deploy a remote runtime environment on cluster infrastructure 176 to run software and verify the behavior of the software against tests in a test suite.

Various kinds of tests such as ones described above are run often and at high volume. For the most part, tests are deterministic. However, in some cases, tests are flaky (e.g., the test results of a test are inconsistent). Developer 194 may be responsible for debugging the tests if a test fails or if a test is flaky. Debugging for a non-deterministic issue, such as flaky tests, can be time consuming and resource intensive. It would be desirable for application orchestration and workloads manager 180 to provide effective tools to developers such as developer 194 to debug flaky tests.

Exemplary Systems for Providing a Remote Debugging Session for a Flaky Test

Providing a suitable remote debugging session to pinpoint a cause for a flaky test is not trivial. A flaky test may have a "pass" result in 999 of 1000 executions of a piece of software, and may have a "fail" result in 1 of 1000 executions of a piece of software. In other words, it is not simple nor easy to reproduce the "fail" result because the "fail" result may occur infrequently.

Reproduction of the "fail" test result may be susceptible to differences in the runtime environment and/or differences in hardware resources (e.g., CPU, GPU, memory). To more easily reproduce a "fail" test result and to better diagnose the cause for the "fail" test result, a remote debugging session preferably tries to run the software being tested in a same/matching/compatible environment as the original runtime environment of the software being tested. Minimizing differences in the reproduction runtime environment and the original runtime environment can more faithfully reproduce the "fail" test result. In some cases, it may be beneficial if the underlying hardware resources used for the original runtime environment matches the underlying hardware resources used for the reproduction runtime environment, since hardware changes or differences may impact test results and complicate the developer's ability to narrow down causes for the flaky test result.

In some cases, a test having a flaky result that was previously executed remotely (e.g., on cluster infrastructure)

may not be reproducible locally on a developer machine. Preferably, to debug flaky tests that were executed remotely, the debugging session tries to reproduce the "fail" test result remotely.

Expensive resources can be consumed on cluster infrastructure to reproduce a "fail" test result of a flaky test. It may be preferable to limit or control a number of executions to be performed to reproduce the "fail" test result of a flaky test. Also, expensive resources can be consumed to deploy and create tools onto cluster infrastructure to support the remote debugging session to debug the flaky test. Sessions may be responsibly terminated and resources may be recycled using time-outs.

Once a "fail" test result is produced in an execution, the remote debugging session can provide tools useful to the developer to inspect the runtime environment of the execution and source code to debug and understand the "fail" test result. A developer may be provided with secure access and permissions to the runtime environment of the execution having the "fail" test result. Granting access and providing permissions to the runtime environment preferably do not compromise or impact integrity of other workloads running on a same node/worker. The tools themselves preferably do not hoard resources or impact availability of resources to other workloads on the same node/worker.

The remote debugging session preferably can be deployed and created with low latency (e.g., thereby making the developer experience better), and the remote debugging session preferably is simple for a developer to start, create, and use. A developer may identify a flaky test with a job identifier and make a request to create a remote debugging session that can help figure out the cause of the flakiness. The developer preferably does not have to provision and configure resources on cluster infrastructure to reproduce the "fail" test result, and is abstracted away from the details of creating such a remote debugging session.

Figure 2:
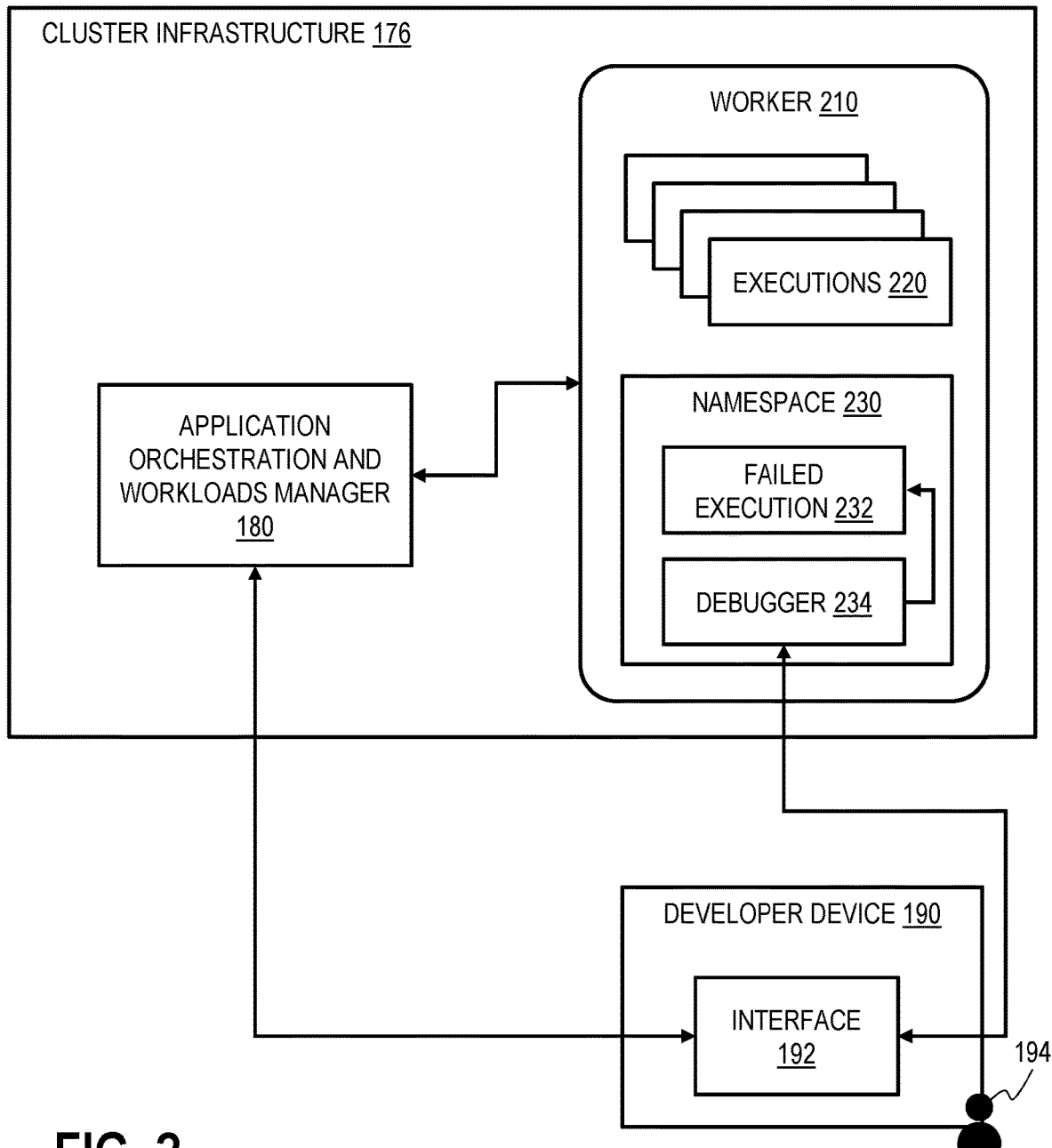
FIG. 2 illustrates an exemplary system to provide remote debugging sessions for flaky tests, according to some aspects of the disclosed technology.
Figure 3:
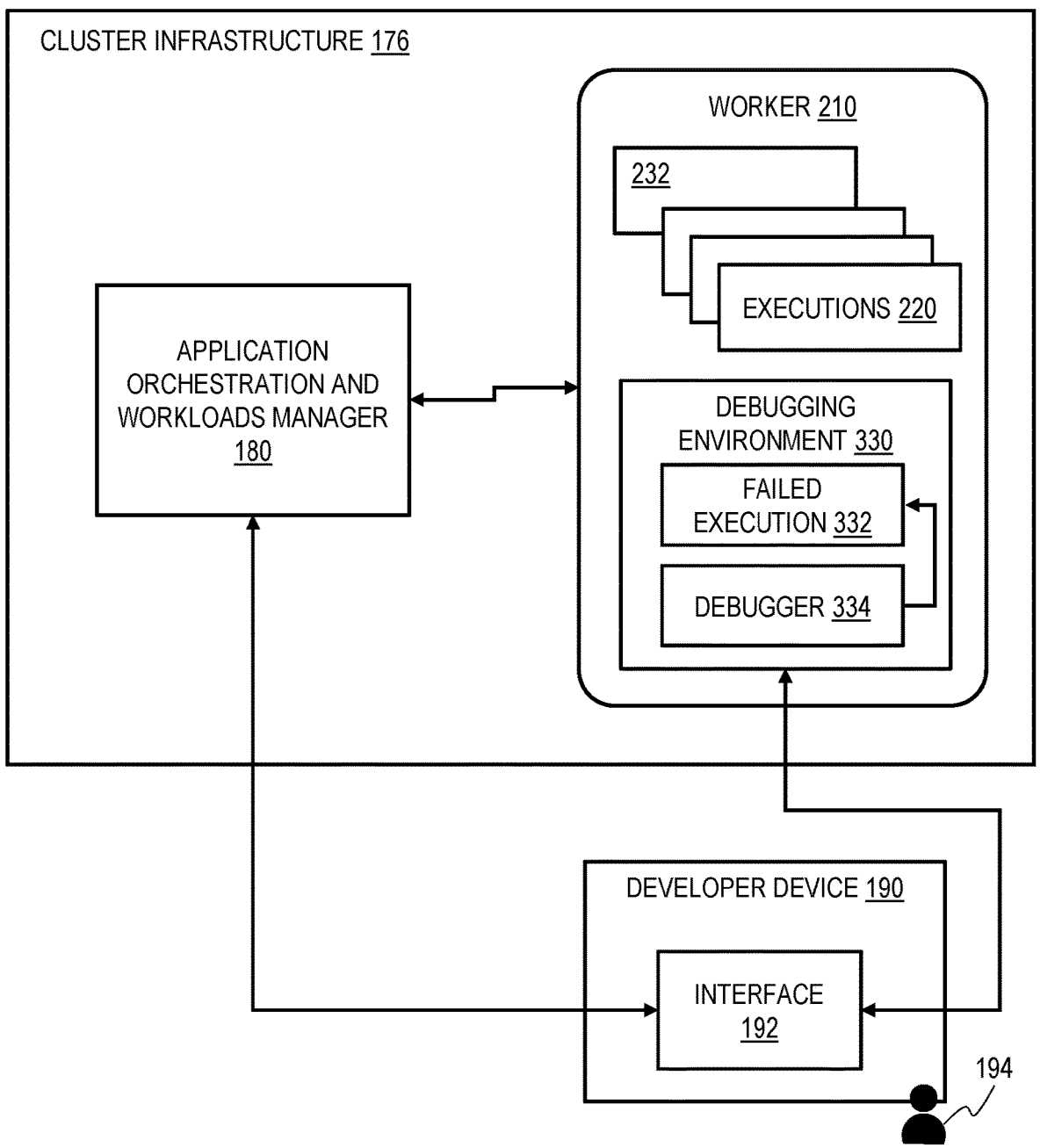
FIG. 3 illustrates an exemplary system to provide remote debugging sessions for flaky tests, according to some aspects of the disclosed technology.
Figure 4:
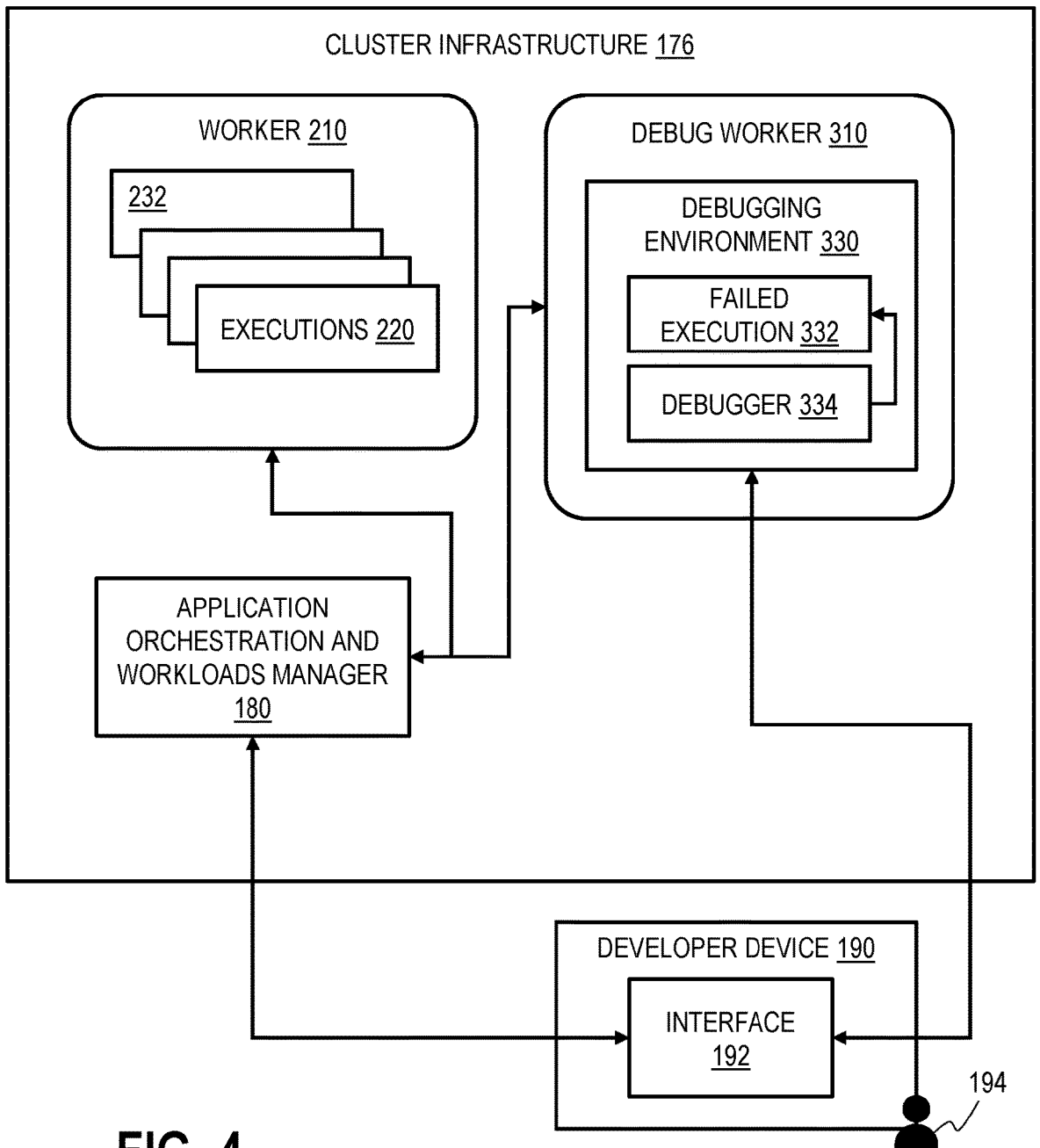
FIG. 4 illustrates an exemplary system to provide remote debugging sessions for flaky tests, according to some aspects of the disclosed technology.

FIGS. 2-4 illustrate exemplary implementations and systems for providing a remote debugging session for a flaky test.

The systems in FIGS. 2-4 may include a developer device 190 having an interface 192, and developer 194 that is using developer device 190. Cluster infrastructure 176 includes application orchestration and workloads manager 180, and one or more workers such as worker 210. Developer 194 may, via interface 192, submit one or more tests to be run on a piece of software. Application orchestration and workloads manager 180 may receive the one or more tests and cause the one or more tests to be executed on cluster infrastructure 176.

A test can be identified as flaky based on analysis of past results of the test. "Pass" results and "fail" results may be counted. Non-deterministic behavior may be identified from the past results of the test. Flake rate of a test may be a percentage of test results that were a "fail" result out of a total number of test results. For example, a flake rate may be 1%, or 1 out of 100 test results. A flake rate may be 0.1%, or 1 out of 1000 test results.

A test may be identified as flaky based on statistical or probabilistic analysis of the past results. Each past result may represent an observation of whether a test is flaky. Each observation may update a flakiness model of the test which may yield information whether a test is flaky or not. In some cases, the flakiness model may yield a flake rate that approximates an actual flake rate of a test as if the test was run many times (e.g., 1000+ times).

Application orchestration and workloads manager 180 may analyze the results of the one or more tests. Application orchestration and workloads manager 180 may report the results and optionally flakiness of the one or more tests to developer 194 via interface 192. Developer 194 may identify that a test is flaky.

FIGS. 2-4 illustrate methods that can be carried out and systems that can be implemented in response to identifying a flaky test. In some embodiments, developer 194, in response to identifying a flaky test or determining that a test that was run was flaky, may provide user input via interface 192 to trigger a remote debugging session to be created to debug the flaky test. Developer 184 may provide, via interface 192, a request to create a remote debugging session for the flaky test to application orchestration and workloads manager 180. For example, developer 194 may provide a job (or task) identifier that identifies the job/task that has a flaky test result. The job identifier may identify a job (or task) that was executed previously on cluster infrastructure 176 that reported inconsistent test results.

Application orchestration and workloads manager 180 can receive the request to create a remote debugging session for the identified flaky test, and determine a suitable debugging environment for debugging the flaky test. Application orchestration and workloads manager 180 may have a collection of different images for various types of debugging environments and select a suitable debugging environment to use. The selected image may be used to provision the debugging environment on cluster infrastructure 176. The debugging environment may include a suitable runtime (or execution) environment to run executions. A suitable runtime environment may include a same (e.g., matching or equivalent) runtime environment as the original runtime environment that was used for the executions that resulted in the flakiness. The debugging environment may include one or more suitable tools for the developer 194 to inspect the runtime environment of a paused execution and debug the cause for the flakiness of the test. The suitable tools may include tools which are compatible or recommended for the runtime environment. The suitable tools may include a copy of the source code of the executions and a code editor to view the source code.

In some cases, developer 194 may specify a failure condition associated with the flaky test results, and provide the failure condition via the interface 192 to application orchestration and workload manager 180. The failure condition may include a "fail" test result occurring. The failure condition may include an event that may appear in an execution. The event may be related to the root cause of the flakiness (e.g., developer 194 may make an educated guess). The failure condition may include a breakpoint, e.g., an intentional stopping or pausing place in the execution where the execution is to be interrupted or paused.

In response to the request to create the remote debugging session for debugging the flaky test, the job/task (referred herein as an execution) is determined, and a process begins to reproduce the flaky test result. Specifically, the process may run many executions and watch for a "fail" test result, or a failure condition to occur in at least one of the executions. In some embodiments, application orchestration and workloads manager 180 may schedule a number of executions to be run on one or more workers on cluster infrastructure. In FIGS. 2-4, application orchestration and workloads manager 180 may schedule a number of executions 220 on worker 210.

A failed execution (or a failure condition in an execution) may be identified in the executions 220. In FIGS. 2-4, a failed execution 232 may be identified (as being one of the executions 220). Identifying the failed execution may include identifying an execution where the test results in a "fail" test result. Identifying the failed execution may include watching for a failure condition while the executions are being run on worker 210, and determining an execution is the failed execution 232 if the execution meets the failure condition.

The flaky test may be a remote build execution test. To reproduce the flaky test result, multiple remote build execution jobs may be scheduled and executed as executions 220. The flaky test may be a unit test of an autonomous vehicle stack under simulation. To reproduce the flaky test result, multiple simulation jobs may be scheduled and executed as executions 220. The flaky test may be associated with other kinds of tests mentioned herein. Multiple executions may be scheduled and executed as executions 220 to perform the test many times with the goal of reproducing the flaky test result (e.g., a "fail" test result).

In some embodiments, the number of executions 220 may be determined based on a flake rate of the flaky test, if the flake rate is known. If the flake rate is high, the number of executions 220 may be small, since a "fail" test result may be reproduced easily. If the flake rate is low, the number of executions 220 may be larger, since a "fail" test result may be more difficult to reproduce. For example, if the flake rate is 1% (the test fails 1 out of 100 tests), then the number may be 100. If the flake rate is 0.1% (the test fails 1 out of 1000 tests), then the number may be 1000. The number of executions 220 may be inversely proportional to the flake rate. If a test results in a "fail" test result very infrequently, then a number of executions 220 that may be run to reproduce the "fail" test result may be a larger number.

In some embodiments, at least a subset of the executions 220 may be executed in parallel on the worker 210 in the cluster infrastructure 176.

Running a number of executions 220 can be resource intensive (especially if the number is large), and can create a load spike on cluster infrastructure 176. While cluster infrastructure 176 can offer scaling of resources and ability to run many executions 220 in parallel, an amount of parallelism at a given point in time can be limited to reduce resource consumption for the given point in time. For example, sets of parallel executions can be staggered or staged over time. For example, (small) batches or subsets of executions may be scheduled on worker 210, one after another, so that sets of parallel executions making up the number of executions 220 can be performed in a staged manner.

In some embodiments, a full number of executions 220 may not be executed, and a partial number of executions 220 are completed. For example, scheduling the number of executions 220 to be run on cluster infrastructure 176 may include scheduling a subset of the full number of executions 220 (e.g., a percentage of the number of executions 220) to be run on worker 210. The subset of executions may be run in parallel. The result of the subset of executions may be watched to determine if the failed execution can be identified. Further executions may be halted from being run in response to the failed execution 232 being identified.

In some embodiments, the scheduling of the number of executions 220 to be run may include scheduling the number of executions 220 according to an urgency level and/or a priority level associated with the flaky test, or with the job/task that is exhibiting a flaky test result. In some cases, the number may be increased if the urgency level and/or the priority level is high. In some cases, a number of executions 220 to be executed in parallel on worker 210 may be increased if the urgency level and/or the priority level is high so that the "fail" test result may be reproduced sooner.

In response to identifying the failed execution 232, the execution of the failed execution 232 may be paused or interrupted. The failed execution 232 may be placed in a state that is suitable for debugging. The failed execution 232 may be placed in a state that allows developer 194 to inspect the runtime environment of the failed execution 232 at a breakpoint. In some cases, the failed execution 232 may be placed in a state that allows developer 194 to step forward and/or backwards in the source code to assess a cause for the failure condition occurring.

FIGS. 2-4 illustrate different ways for provisioning the debugging tools to examine the failed execution 232 or a relaunched failed execution 332. Regardless of the variations in implementation, developer 194 may be provided with a secured communication connection with the debugging tool, so that developer 194 may inspect a failed execution 232 or relaunched failed execution 332 via interface 192 at developer device 190. Encryption keys and/or cryptographic signatures may be exchanged and used to authenticate and authorize developer 194 to access the debugging tool and the failed execution 232. For instance, a secure socket shell (SSH) tunnel connection may be created between the debugger instance 234 or debugging environment 330 (depending on the implementation) and the interface 192 on the developer device 190 that is remote from cluster infrastructure 176. The connection may allow developer 194 to access the debugger instance 234 or debugging environment 330 (depending on the implementation).

FIG. 2 illustrates an exemplary system to provide remote debugging sessions for flaky tests, according to some aspects of the disclosed technology. Specifically, FIG. 2 illustrates an implementation where a debugger instance 234 can be instantiated (e.g., scheduled on worker 210). The debugger instance 234 running on one or more workers on cluster infrastructure 176 may be attached to the identified failed execution 232. The debugger instance 234 can have a copy of source code of the identified failed execution 232, and the debugger instance 234 can have access (and permissions) to an execution environment of the identified failed execution 232. The debugger instance 234 may include tool(s) to view the copy of source code and inspect values of objects/variables of the identified failed execution 232. The debugger instance 234 may include tool(s) to allow developer 194 to control the failed execution 232 from the start of the failed execution 232. The debugger instance 234 may include tool (s) to allow developer 194 to step the failed execution 232 forward and/or backwards.

In some embodiments, the debugger instance 234 may be attached to a failed execution 232 and scheduled within the same namespace 230 within worker 210. The debugger instance 234 and the failed execution 232 sharing the same namespace 230 within worker 210 can ensure that the debugger instance 234 may access the execution/runtime environment of the failed execution 232. Having different namespaces enable process isolation within worker 210. Executions or applications within the same namespace within worker 210 may have access to each other.

In embodiments where the failed execution 232 and the debugger instance 234 are containerized applications or containers, the debugger instance 234 may be a sidecar container attached to the failed execution 232. The failed execution 232 and the debugger instance 234 may be containers that run side-by-side on worker 210.

In some cases, a debugger instance, such as one like debugger instance 234 may be instantiated for and attached to one or more executions in executions 220. A debugger instance may already be instantiated and attached to an execution in executions 220 before the failure condition occurs.

FIG. 2 involves an approach where a debugger instance 234 may be instantiated for a remote debugging session, and placed alongside the failed execution 232. In some cases, it may be beneficial to move the failed execution to a debugging environment, or relaunch the failed execution (e.g., a copy or snapshot of the failed execution) within a debugging environment. The debugging environment may have the failed execution (or a relaunched failed execution) and a debugger nested within the debugging environment. The debugging environment may be a persistent application that is deployed in cluster infrastructure 176. A developer 194 may have access to the debugging environment and ability to cause different failed executions to be loaded into the debugging environment. The debugging environment may be reused to debug other executions, including other failed executions to identify causes for a flaky test.

FIGS. 3 and 4 illustrate implementations where a debugging environment 330 is created and instantiated, and a failed execution 232 in executions 220 may be moved, copied, or relaunched as failed execution 332 within the debugging environment 330. The debugging environment 330 may have a debugger 334. Debugger 334 may be the same or similar to debugger instance 234 in FIG. 2.

In some cases, the failed execution 232 may be relocated or moved to the debugging environment 330 as failed execution 332. Failed execution 332 may be nested within debugging environment 330, e.g., as a container within another container, and/or as part of a namespace that is nested within another namespace. In FIGS. 3 and 4, a failed execution 232 may be identified, and the execution of the identified failed execution 232 may be paused. A snapshot of the identified failed execution 232 may be saved. Saving a snapshot may involve storing information of the identified failed execution 232 that enables a different worker to restore or relaunch the identified failed execution 232 at the point where the execution encountered the failure condition (e.g., at the breakpoint).

In FIGS. 3 and 4, the identified failed execution 232 may be launched or relaunched using the snapshot. The identified failed execution 332 may be a copy or relaunched version of the identified failed execution 232. The identified failed execution 332 may run within debugging environment 330. Debugging environment 330 may trigger the snapshot to be downloaded. The debugging environment 330 can have a copy of source code of the identified failed execution. The debugging environment 330 may have a code editor to allow developer 194 to view the copy of the source code via interface 192. The debugging environment 330 may have a debugger 334 that may allow the developer 194 to inspect the execution environment of the identified failed execution 332 (i.e., the debugging environment 330). Debugger 334 may allow the developer 194 to inspect values of objects/variables of the identified failed execution 332 when the identified failed execution 332 encountered the failure condition. The debugging environment 330 may have an execution environment to run identified failed execution 332.

A debugging environment 330 that is persistent may be accessible by developer 194 via an SSH tunnel connection between the debugging environment 330 and an interface 192 on developer device 190 remote from cluster infrastructure 176. Developer 194 may be persistently connected to a debugging environment 330 and avoid repeated cycles of creating and waiting for a debugging environment to be created to start a remote debugging session. Allowing the identified failed execution 332 to be relaunched within debugging environment 330, other failed executions 332 can be plugged into or launched within debugging environment 330 without needing to create and connect to a new debugging environment.

In some cases, it may be preferable for resources supporting the remote debugging session to not impact or poison normal executions in cluster infrastructure 176. Having both normal executions and debugging environments within the same worker or the same worker pool may starve resources that could result in failures. Such situations may impact the ability to reproduce the flaky test result. In addition, having both normal executions and debugging environments within the same worker or the same worker pool may impact scheduling and auto-scaling of worker pools. Debugging environments may have a much longer life cycle than normal executions, and could hog resources, or influence a pipeline of work on a machine.

In some embodiments, the debugging environment 330 may be scheduled to run on a dedicated debug worker pool, e.g., debug worker 310, which is separate from worker 210. The debugging environment 330 in FIG. 3 may be scheduled to be created or run on debug worker 310 instead of in worker 210. Worker 210 may be in a first worker pool, and debug worker 310 may be in a second worker pool separate from the first worker pool.

In some cases, it may be preferable to reproduce the flaky test result using the same underlying hardware as the original execution. If the debug worker 310 is to host the debugging environment 330, debug worker 310 may preferably have the same type of hardware resources as the one or more second workers (e.g., same model of CPU, same model of GPU, same speed of memory, etc.).

In some cases, rather than relocating or moving a failed execution 232 into a debugging environment 330 after it has been identified as the failed execution, one or more executions of the executions 220 may be scheduled to run within a debugging environment, and then the debugging environment can watch for a failed condition and identify a failed execution within the debugging environment as the executions within the debugging environment runs. In some cases, one or more executions 220 may be run within a corresponding debugging environment. In some cases, executions 220 may each be run within a corresponding debugging environment. In some cases, all executions 220 may be run within a debugging environment.

While only a singular worker 210 and a singular debug worker 310 is shown in the figures, it is envisioned that worker 210 and debug worker 310 may represent multiple (identical or duplicate) workers in a worker pool. A worker pool may be configured to scale up or down depending on the workloads on the worker pool. A worker pool may be configured to recycle or terminate resources when resources are not being used.

Resources Conservation and Remote Debugging Session Management

Valuable resources on cluster infrastructure may be consumed by remote debugging sessions for flaky tests. Developers may prefer an experience where remote debugging sessions can be created and made ready quickly, but the improved experience may come at the expense of higher and potentially inefficient resource utilization of the cluster infrastructure.

When a flaky test is identified, a number of executions can be scheduled onto one or more first workers on cluster infrastructure. A debugging environment may be scheduled (or may already be provisioned previously) onto one or more second workers on the cluster infrastructure. The one or more second workers can be in a separate worker pool from the one or more first workers. In response to identifying a failed execution in the number of executions, the failed execution may be paused and migrated to the debugging environment. Similar to FIGS. 2-4, a secure socket shell tunnel connection may be provisioned or created between the debugging environment and an interface on a user device remote from the cluster infrastructure to allow a user to access the debugging environment.

To prevent unused or inactive remote debugging sessions from hogging up resources on cluster infrastructure, a time-out mechanism may be implemented. In some cases, if a period of inactivity within the debugger instance exceeds a threshold, the remote debugging session may be terminated and resources on cluster infrastructure to support the remote debugging session may be terminated or recycled. In some cases, a message may be transmitted to the user, e.g., upon the period of inactivity exceeding threshold, to confirm whether to keep the debugging environment running/alive. The message may be transmitted after a period of inactivity within the debugger instance has lapsed. In some cases, in response to a time-out period expiring and a response is not received from the user to the message, the debugging environment may be terminated. Resources to support the debugging environment can be freed up for other uses, such as other remote debugging sessions.

In some cases, a user may provide an indication that a debugging session is completed (e.g., the user has finished debugging the flaky test, or no longer needs to debug the flaky test), the debugging environment may be terminated. Resources to support the debugging environment can be freed up for other uses, such as other remote debugging sessions.

Exemplary Methods for Providing a Remote Debugging Session for a Flaky Test

Figure 5:
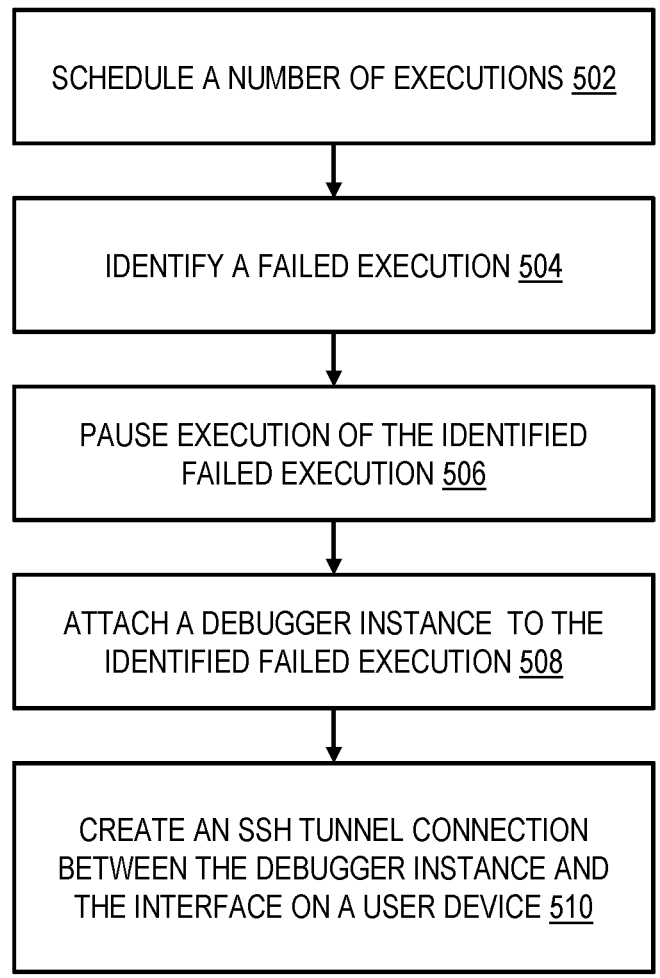
FIG. 5 is a flow diagram illustrating a method for providing a remote debugging session for a flaky test, according to some aspects of the disclosed technology.

FIG. 5 is a flow diagram illustrating a method for providing a remote debugging session for a flaky test, according to some aspects of the disclosed technology. The method may be performed by one or more components illustrated in FIGS. 2-4. In 502, in response to a request to create the remote debugging session for the flaky test, a number of executions may be scheduled to be run on one or more workers on cluster infrastructure. In 504, a failed execution in the executions may be identified. In 506, execution of the identified failed execution may be paused. In 508, a debugger instance on one or more workers on cluster infrastructure may be attached to the identified failed execution. The debugger instance may include a copy of source code of the identified failed execution. The debugger instance may have access to an execution environment of the identified failed execution. In 510, a secure socket shell tunnel connection between the debugger instance and an interface on a user device remote from the cluster infrastructure may be created. The connection may allow a user to access the debugger instance.

Figure 6:
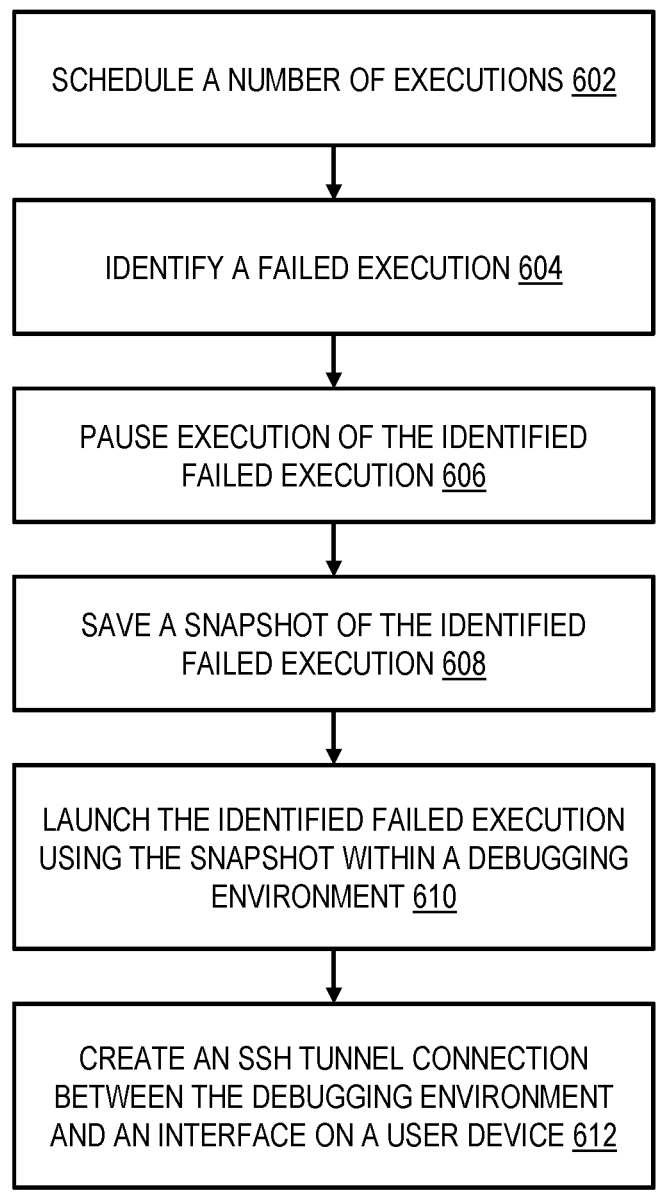
FIG. 6 is a flow diagram illustrating another method for providing a remote debugging session for a flaky test, according to some aspects of the disclosed technology.

FIG. 6 is a flow diagram illustrating another method for providing a remote debugging session for a flaky test, according to some aspects of the disclosed technology. The method may be performed by one or more components illustrated in FIGS. 2-4. In 602, in response to a request to create the remote debugging session for the flaky test, a number of executions may be scheduled to be run on one or more first workers on cluster infrastructure. In 604, a failed execution may be identified in the executions. In 606, execution of the identified failed execution may be paused.

In 608, a snapshot of the identified failed execution may be saved. In 610, the identified failed execution may be launched using the snapshot within a debugging environment. The debugging environment may have a copy of source code of the identified failed execution. The debugging environment may have an execution environment to run the identified failed execution. In 612, a secure socket shell tunnel connection may be created between the debugging environment and an interface on a user device remote from the cluster infrastructure to allow a user to access the debugging environment.

Figure 7:
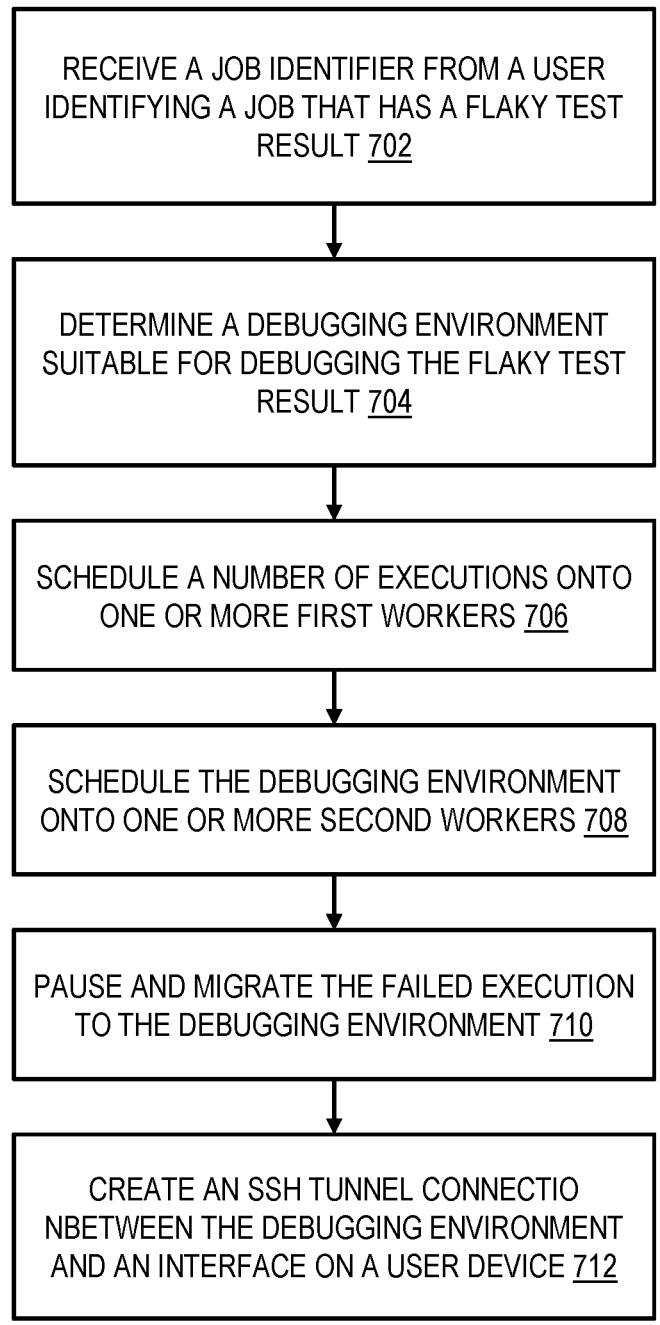
FIG. 7 is a flow diagram illustrating yet another method for providing a remote debugging session for a flaky test, according to some aspects of the disclosed technology.

FIG. 7 is a flow diagram illustrating yet another method for providing a remote debugging session for a flaky test, according to some aspects of the disclosed technology. The method may be performed by one or more components illustrated in FIGS. 2-4. In 702, a job identifier may be received from a user identifying a job that has a flaky test result. In 704, a debugging environment suitable for debugging the flaky test result may be determined. In 706, a number of executions may be scheduled onto one or more first workers on cluster infrastructure. In 708, the debugging environment may be scheduled onto one or more second workers on the cluster infrastructure. The one or more second workers can be in a separate worker pool from the one or more first workers. In 710, in response to identifying a failed execution in the number of executions, the failed execution may be paused and migrated to the debugging environment (e.g., using a snapshot). In 712, a secure socket shell tunnel connection may be created between the debugging environment and an interface on a user device remote from the cluster infrastructure. The connection may allow a user to access the debugging environment.

Exemplary Processor-Based System

Figure 8:
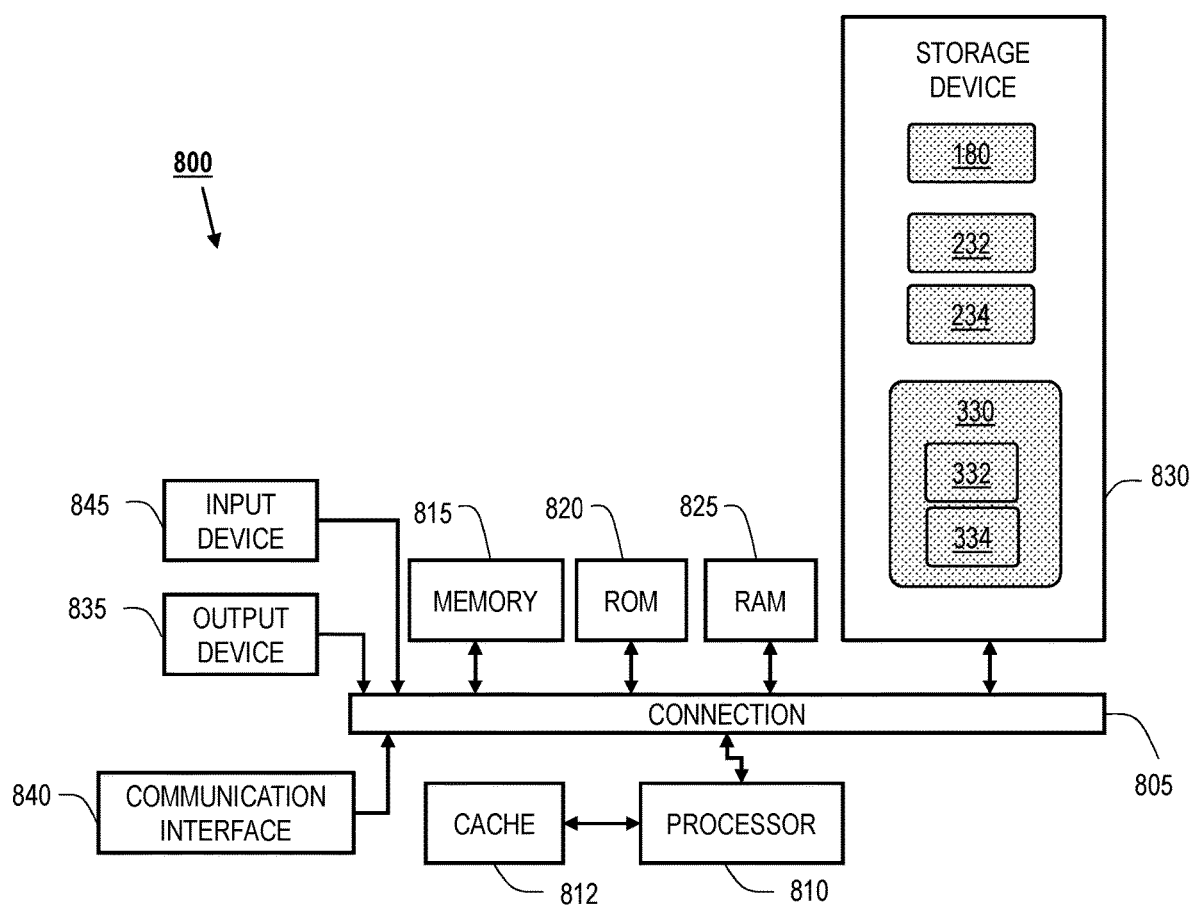
FIG. 8 illustrates an exemplary processor-based system with which some aspects of the subject technology may be implemented.

FIG. 8 illustrates an exemplary processor-based system with which some aspects of the subject technology may be implemented. For example, processor-based system 800 may be any computing device making up, or any component thereof in which the components of the system are in communication with each other using connection 805. Connection 805 may be a physical connection via a bus, or a direct connection into processor 810, such as in a chipset architecture. Connection 805 may also be a virtual connection, networked connection, or logical connection.

In some embodiments, computing system 800 can represent the local computing device 110 of FIG. 1. In some embodiments, computing system 800 can represent parts of cluster infrastructure 176 in data center 150 of FIG. 1. In some embodiments, computing system 800 can represent client computing device 170 of FIG. 1. In some embodiments, computing system 800 can represent developer device 190 of FIG. 1. In some embodiments, one or more of the described system components represents many such components each performing some or all of the function for which the component is described. In some embodiments, the components may be physical or virtual devices.

Exemplary system 800 includes at least one processing unit (e.g., a CPU or another suitable processor) 810 and connection 805 that couples various system components including system memory 815, such as Read-Only Memory (ROM) 820 and Random-Access Memory (RAM) 825 to processor 810. Computing system 800 may include a cache of high-speed memory 812 connected directly with, in close proximity to, or integrated as part of processor 810.

Processor 810 may include any general-purpose processor and a hardware service or software service, such as executable instructions that implement functionalities such as methods and processes described herein. The functionalities carried out by one or more of: application orchestration and workloads manager 180, interface 192, failed execution 232, debugger instance 234, debugging environment 330, failed execution 332, and debugger 334. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms known to those of skill in the art. In some instances, multimodal systems may enable a user to provide multiple types of input/output to communicate with computing system 800. Computing system 800 may include communications interface 840, which may generally govern and manage the user input and system output. The communication interface may perform or facilitate receipt and/or transmission of wired or wireless communications via wired and/or wireless transceivers.

Storage device 830 may be a non-volatile and/or non-transitory and/or computer-readable memory device and may be a hard disk or other types of computer-readable media which may store data that are accessible by a computer.

Storage device 830 may include software services, servers, services, etc., that when the code that defines such software is executed by the processor 810, causes the system 800 to perform a function. In some embodiments, a hardware service that performs a particular function may include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 is a computer-implemented method for providing a remote debugging session for a flaky test, comprising: in response to a request to create the remote debugging session for the flaky test, scheduling a number of executions to be run on one or more workers on cluster infrastructure; identifying a failed execution in the executions; pausing execution of the identified failed execution; attaching a debugger instance on one or more workers on cluster infrastructure to the identified failed execution, wherein the debugger instance has a copy of source code of the identified failed execution, and the debugger instance has access to an execution environment of the identified failed execution; and creating a secure socket shell tunnel connection between the debugger instance and an interface on a user device remote from the cluster infrastructure to allow a user to access the debugger instance.

In Example 2, the computer-implemented method of Example 1 can optionally include identifying the failed execution comprising: watching for a failure condition while the executions are being run; and determining an execution is the failed execution if the execution meets the failure condition.

In Example 3, the computer-implemented method of Example 1 or 2 can optionally include the flaky test being a remote build execution test.

In Example 4, the computer-implemented method of any one Examples 1-3 can optionally include the flaky test being a unit test of an autonomous vehicle stack under simulation.

In Example 5, the computer-implemented method of any one of Examples 1-4 can optionally include scheduling the number of executions to be run comprising: scheduling parallel executions to be run the one or more workers; and halting further executions to be run in response to the failed execution being identified.

In Example 6, the computer-implemented method of any one of Examples 1-5 can optionally include the number of executions to be run is determined based on a flake rate of the flaky test.

In Example 7, the computer-implemented method of any one of Examples 1-6 can optionally include scheduling the number of executions to be run comprising: causing at least a subset of the executions to be executed in parallel on the one or more workers in the cluster infrastructure.

In Example 8, the computer-implemented method of any one of Examples 1-7 can optionally include scheduling the number of executions to be run comprising: scheduling the number of executions to be run according to a priority level associated with the flaky test.

In Example 9, the computer-implemented method of any one of Examples 1-8 can optionally include: transmitting a message to the user to confirm whether to keep the debugger instance running after a period of inactivity within the debugger instance has lapsed.

In Example 10, the computer-implemented method of Example 9 can optionally include: in response to a time-out period expiring and not receiving a response from the user to the message, terminating the debugger instance.

In Example 11, the computer-implemented method of any one of Examples 1-10 can optionally include: scheduling the debugger instance within a same namespace along with the identified failed execution.

Example 12 is a computer-implemented method for providing a remote debugging session for a flaky test, comprising: in response to a request to create the remote debugging session for the flaky test, scheduling a number of executions to be run on one or more first workers on cluster infrastructure; identifying a failed execution in the executions; pausing execution of the identified failed execution; saving a snapshot of the identified failed execution; launching the identified failed execution using the snapshot within a debugging environment, wherein the debugging environment has a copy of source code of the identified failed execution, and the debugging environment has an execution environment to run the identified failed execution; and creating a secure socket shell tunnel connection between the debugging environment and an interface on a user device remote from the cluster infrastructure to allow a user to access the debugging environment.

In Example 13, the computer-implemented method of Example 12 can optionally include: scheduling the debugging environment to be created on one or more second workers in a worker pool that is separate from the one or more first workers.

In Example 14, the computer-implemented method of Example 13 can optionally include: the one or more first workers running the executions have a same type of hardware resources as the one or more second workers.

In Example 15, the computer-implemented method of any one of Examples 12-14 can optionally include: the identified failed execution that is launched within the debugging environment being in a namespace that is nested within a namespace of the debugging environment.

In Example 16, the computer-implemented method of any one of Examples 12-15 can optionally include: launching a further identified failed execution within the debugging environment.

Example 17 is a computer-implemented method for providing a remote debugging session for a flaky test, comprising: receiving a job identifier from a user identifying a job that has a flaky test result; determining a debugging environment suitable for debugging the flaky test result; scheduling a number of executions onto one or more first workers on cluster infrastructure; scheduling the debugging environment onto one or more second workers on the cluster infrastructure, wherein the one or more second workers are in a separate worker pool from the one or more first workers; in response to identifying a failed execution in the number of executions, pausing and migrating the failed execution to the debugging environment; and creating a secure socket shell tunnel connection between the debugging environment and an interface on a user device remote from the cluster infrastructure to allow a user to access the debugging environment.

In Example 18, the computer-implemented method of Example 17 can optionally include transmitting a message to the user to confirm whether to keep the debugging environment running after a period of inactivity within the debugging environment has lapsed.

In Example 19, the computer-implemented method of Example 18 can optionally include: in response to a time-out period expiring and not receiving a response from the user to the message, terminating the debugging environment.

In Example 20, the computer-implemented method of Example 18 or 19 can optionally include in response to an indication from the user that a debugging session is completed, terminating the debugging environment.

Example A is a computing system for providing a remote debugging session for a flaky test, comprising: one or more processors; one or more storage devices to store instructions executable by the one or more processors; and one or more components (e.g., one or more of: application orchestration and workloads manager 180, interface 192, failed execution 232, debugger instance 234, debugging environment 330, failed execution 332, and debugger 334) encoded in the instructions to perform any one of the computer-implemented methods in Examples 1-20.

Example B has one or more non-transitory computer-readable medium having instructions stored thereon, that when executed by one or more processors, cause the one or more processors to perform any one of the computer-implemented methods in Examples 1-20.

Example C is an apparatus comprising means to carry out or perform any one of the computer-implemented methods in Examples 1-20.

What is claimed is:

1. A computer-implemented method for providing a remote debugging session for a flaky test, comprising:
   in response to a request to create the remote debugging session for the flaky test, scheduling a number of executions to be run on one or more workers on cluster infrastructure, wherein scheduling the number of executions to be run comprises causing at least a subset of the number of executions to be executed in parallel on the one or more workers in the cluster infrastructure;
   identifying a failed execution in the number of executions;
   pausing execution of the identified failed execution;
   attaching a debugger instance on one or more workers on cluster infrastructure to the identified failed execution, wherein the debugger instance has a copy of source code of the identified failed execution, and the debugger instance has access to an execution environment of the identified failed execution; and
   creating a secure socket shell tunnel connection between the debugger instance and an interface on a user device remote from the cluster infrastructure to allow a user to access the debugger instance.

2. The computer-implemented method of claim 1, wherein identifying the failed execution comprises:
watching for a failure condition while the number of executions are being run; and
determining an execution is the failed execution if the execution meets the failure condition.

3. The computer-implemented method of claim 1, wherein the flaky test is a remote build execution test.

4. The computer-implemented method of claim 1, wherein the flaky test is a unit test of an autonomous vehicle stack under simulation.

5. The computer-implemented method of claim 1, wherein scheduling the number of executions to be run comprises:
scheduling parallel executions in the number of executions to be run on the one or more workers; and
halting further executions in the number of executions to be run in response to the failed execution being identified.

6. The computer-implemented method of claim 1, wherein the number of executions to be run is determined based on a flake rate of the flaky test.

7. The computer-implemented method of claim 1, wherein scheduling the number of executions to be run comprises:
scheduling the number of executions to be run according to a priority level associated with the flaky test.

8. The computer-implemented method of claim 1, further comprising:
transmitting a message to the user to confirm whether to keep the debugger instance running after a period of inactivity within the debugger instance has lapsed.

9. The computer-implemented method of claim 8, further comprising:
in response to a time-out period expiring and not receiving a response from the user to the message, terminating the debugger instance.

10. The computer-implemented method of claim 1, further comprising:
scheduling the debugger instance within a same namespace along with the identified failed execution.

11. A computer-implemented method for providing a remote debugging session for a flaky test, comprising:
in response to a request to create the remote debugging session for the flaky test, scheduling a number of executions to be run on one or more first workers on cluster infrastructure;
identifying a failed execution in the number of executions;
pausing execution of the identified failed execution;
saving a snapshot of the identified failed execution;
launching the identified failed execution using the snapshot within a debugging environment, wherein the debugging environment has a copy of source code of the identified failed execution, and the debugging environment has an execution environment to run the identified failed execution;
creating a secure socket shell tunnel connection between the debugging environment and an interface on a user device remote from the cluster infrastructure to allow a user to access the debugging environment; and
scheduling the debugging environment to be created on one or more second workers in a worker pool that is separate from the one or more first workers.

12. The computer-implemented method of claim 11, wherein the one or more first workers running the number of executions have a same type of hardware resources as the one or more second workers.

13. The computer-implemented method of claim 11, wherein the identified failed execution that is launched within the debugging environment is in a namespace that is nested within a namespace of the debugging environment.

14. The computer-implemented method of claim 11, further comprising:
launching a further identified failed execution within the debugging environment.

15. A computer-implemented method for providing a remote debugging session for a flaky test, comprising:
in response to a request to create the remote debugging session for the flaky test, scheduling a number of executions to be run on one or more workers on cluster infrastructure;
identifying a failed execution in the number of executions;
pausing execution of the identified failed execution;
attaching a debugger instance on one or more workers on cluster infrastructure to the identified failed execution, wherein the debugger instance has a copy of source code of the identified failed execution, and the debugger instance has access to an execution environment of the identified failed execution; and
creating a secure socket shell tunnel connection between the debugger instance and an interface on a user device remote from the cluster infrastructure to allow a user to access the debugger instance,
wherein scheduling the number of executions to be run comprises:
scheduling parallel executions in the number of executions to be run on the one or more workers, and
halting further executions in the number of executions to be run in response to the failed execution being identified.

16. The computer-implemented method of claim 15, wherein scheduling the number of executions to be run comprises:
causing at least a subset of the number of executions to be executed in parallel on the one or more workers in the cluster infrastructure.

17. The computer-implemented method of claim 15, wherein scheduling the number of executions to be run comprises:
scheduling the number of executions to be run according to a priority level associated with the flaky test.

18. The computer-implemented method of claim 15, further comprising:
scheduling the debugger instance within a same namespace along with the identified failed execution.

* * * * *